United States Patent
Strauss et al.

(10) Patent No.: US 10,141,628 B2
(45) Date of Patent: Nov. 27, 2018

(54) ANTENNA DEVICE AND METHOD FOR OPERATING THE SAME

(71) Applicant: Fraunhofer-Gesellschaft zur Foerderung der angewandten Forschung e.V., Munich (DE)

(72) Inventors: Wolfram Strauss, Nuremberg (DE); Iker Mayordomo, Erlangen (DE); Lars Weisgerber, Ebersbach-Neugersdorf (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 15/234,721

(22) Filed: Aug. 11, 2016

(65) Prior Publication Data
US 2016/0351993 A1    Dec. 1, 2016

Related U.S. Application Data

(63) Continuation of application No. PCT/EP2015/052657, filed on Feb. 9, 2015.

(30) Foreign Application Priority Data

Feb. 17, 2014    (DE) .................. 10 2014 202 865

(51) Int. Cl.
*H01F 38/14*    (2006.01)
*G08B 13/14*    (2006.01)
(Continued)

(52) U.S. Cl.
CPC ....... *H01Q 1/2216* (2013.01); *G06K 7/10316* (2013.01); *G06K 7/10346* (2013.01);
(Continued)

(58) Field of Classification Search
CPC .......... H01F 38/14; G08B 13/14; H04Q 5/22; G06K 7/00; G06K 7/10
(Continued)

(56) References Cited

U.S. PATENT DOCUMENTS 6,192,222 B1 *   2/2001   Greeff .................. G06K 7/0008
                                                 340/10.4
6,903,656 B1 *   6/2005   Lee ...................... G06K 7/0008
                                                 340/10.1
(Continued)

FOREIGN PATENT DOCUMENTS

KR   1020040053931 A   6/2004
WO   2008/016527 A2    2/2008

*Primary Examiner* — Nam V Nguyen
(74) *Attorney, Agent, or Firm* — Perkins Coie LLP; Michael A. Glenn

(57) ABSTRACT

An active antenna device includes a terminal for receiving a signal to be transmitted, and an antenna for generating a radio signal based on the signal to be transmitted. The active antenna device further includes a controller that is configured to control the antenna depending on the intended properties of the radio signal. The active antenna device includes a coupler between the terminal and the antenna that is configured to decouple a signal portion from the signal to be transmitted. The active antenna device further includes an energy converter that is connected between the coupler and the controller and configured to provide a power signal for the operation of the controller based on the decoupled signal portion.

16 Claims, 8 Drawing Sheets

(51) Int. Cl.
*H04Q 5/22* (2006.01)
*G06K 7/00* (2006.01)
*G06K 7/10* (2006.01)
*G01S 13/04* (2006.01)
*H01Q 1/22* (2006.01)
*H02J 50/10* (2016.01)
*H01Q 1/24* (2006.01)
*H01Q 3/24* (2006.01)
*H01Q 25/00* (2006.01)
*H02J 17/00* (2006.01)
*H02J 7/02* (2016.01)
*H02J 7/34* (2006.01)

(52) U.S. Cl.
CPC .......... *G06K 7/10356* (2013.01); *H01Q 1/24* (2013.01); *H01Q 1/248* (2013.01); *H01Q 3/24* (2013.01); *H01Q 25/004* (2013.01); *H02J 7/025* (2013.01); *H02J 7/34* (2013.01); *H02J 17/00* (2013.01); *H02J 50/10* (2016.02)

(58) Field of Classification Search
USPC ......... 340/10.1–10.5, 572.1, 572.2; 235/376, 235/377, 382.5; 307/104
See application file for complete search history.

(56) References Cited

U.S. PATENT DOCUMENTS

| | | | |
|---|---|---|---|
| 8,242,911 B2 | 8/2012 | Moore et al. | |
| 8,351,968 B2* | 1/2013 | Ovard | G06K 7/0008 455/517 |
| 8,487,478 B2* | 7/2013 | Kirby | G06K 7/0008 307/104 |
| 8,760,261 B2* | 6/2014 | Panchalan | G06K 7/10297 340/10.1 |
| 8,890,745 B2* | 11/2014 | Wahlquist | G01S 13/04 342/22 |
| 8,941,471 B2* | 1/2015 | Shafer | G06K 7/0008 235/375 |
| 2010/0166109 A1* | 7/2010 | Neumann | H03F 1/3247 375/296 |
| 2010/0197261 A1* | 8/2010 | Zibrik | H04B 7/0871 455/232.1 |
| 2011/0109169 A1 | 5/2011 | Shimamoto et al. | |
| 2013/0106643 A1* | 5/2013 | Wahlquist | G01S 13/04 342/27 |
| 2013/0154803 A1 | 6/2013 | Koch | |

* cited by examiner

| coupling | losses | P_OUTPUT | P_harvested |
|---|---|---|---|
| 10 dB | 0.75 dB | 27.25 dBm | 31.5 mW |
| 20 dB | 0.34 dB | 27.65 dBm | 3.1 mW |
| 30 dB | 0.3 dB | 27.7 dBm | 0.3 mW |

Fig. 6

ANTENNA DEVICE AND METHOD FOR OPERATING THE SAME

CROSS-REFERENCE TO RELATED APPLICATIONS

This application is a continuation of copending International Application No. PCT/EP2015/052657, filed Feb. 9, 2015, which claims priority from German Application No. 10 2014 202 865.5, filed Feb. 17, 2014, which are each incorporated herein in its entirety by this reference thereto.

BACKGROUND OF THE INVENTION

The invention relates to an antenna device, for example in a radio-frequency identification environment (RFID), to a method for operating the antenna device, and to a radio-frequency identification system.

Passive radio-frequency identification technology is well-known from object identification applications such as logistics. Basically, a radio-frequency identification tag (RFID tag) returns its identification number being stored in its memory when the RFID tag is being queried by means of an RFID reader. Passive RFID tags do not necessitate an internal power supply, as they may obtain the entire needed power from the electromagnetic field being emitted by the reader.

A typical application includes a gate (RFID gate) with an RFID reader and one or more antennas. Objects provided with a tag (e.g. in the shape of pallets) pass through the gate, and their respective IDs are being read out by the reader. In this situation, a typical problem is that several transponders do not identify all objects (i. e., the identification rate is below 100%). Under optimum conditions, current readers only identify 80%-98% of the RFID tags arranged on a pallet, for example. In specific applications, even a rate of 98% is not sufficient.

In order to increase the identification rate of the system, specific techniques such as antenna beam forming may be used. This method necessitates that the antenna characteristic is being controlled by means of electronics (e.g. a microcontroller, radio-frequency switches, etc.) which leads to the antennas becoming "active".

Usually, RFID readers do not supply a power connection for this type of antennas, and so the power has to be supplied externally, i. e., by means of a voltage supply or a battery. The fact that these "smart" antennas involve an external voltage supply or a battery may be a reason of rejection for potential customers and users, as the readers, for example, have to be modified or bought, which incurs costs, or maintenance (such as changing batteries) is involved, which also incurs costs.

FIG. 8 shows a schematic block diagram of an RFID reader with an active RFID antenna 80 according to conventional technology. The active RFID antenna 80 is connected to an RFID reader 122 and configured to receive an RFID signal to be transmitted 124 from the RFID reader 122. The active antenna 80 comprises a controlled (smart) antenna structure 126 (smart antenna) that is supplied with power by means of a battery or an external power supply 128. The active RFID antenna 80 is configured to transmit the RFID output signal, i. e. the radio signal 132.

SUMMARY

According to an embodiment, an active antenna device may have: a terminal for receiving an RFID signal to be transmitted; an antenna for generating a radio signal based on the RFID signal to be transmitted; a controller that is configured to control properties of the antenna; a coupler between the terminal and the antenna that is configured to decouple a signal portion from the RFID signal to be transmitted; and an energy converter that is connected between the coupler and the controller and configured to provide a power signal for the operation of the controller based on the decoupled signal portion; wherein the active antenna device is an energy self-sufficient device.

According to another embodiment, a radio-frequency identification system may have: a radio-frequency identification reader; and at least one inventive active antenna device.

According to another embodiment, a method for an energy self-sufficient operation of an active antenna device for sending RFID signals may have the steps of: receiving an RFID signal to be transmitted; generating a radio signal based on the RFID signal to be transmitted; controlling antenna properties; decoupling a signal portion between a terminal and an antenna from the RFID signal to be transmitted; and providing a power signal for the energy self-sufficient operation of a controller based on the decoupled signal portion.

Therefore, the core idea of the present invention is that the energy for operating active components of an active antenna device is extracted from a signal to be transmitted. The active antenna device is provided with the signal to be transmitted at a terminal. A signal portion is being decoupled from the signal to be transmitted, so that energy which is gained from the decoupled signal portion enables an operation of active components independent of an external power connection or a battery. This enables elimination of battery changes and an extension of maintenance cycles for the active antenna device.

Embodiments of the present invention provide an active antenna device with a terminal for receiving a signal to be transmitted and an antenna for generating a radio signal based on the signal to be transmitted. The active antenna device comprises a controller that is configured to control the antenna depending on the properties of the radio signal. The active antenna device further comprises a coupler between the terminal and the antenna that is configured to decouple a signal portion from the signal to be transmitted. The active antenna device further comprises an energy converter that is connected between the coupler and the controller and configured to provide a power signal for the operation of the controller based on the decoupled signal portion.

An advantage of this embodiment is that the power signal may be decoupled in an energy-efficient way from the signal to be transmitted, so that a signal attenuation of the signal to be transmitted, which is caused by the decoupling, may be neglected or compensated for, and so that the power signal enables an energy self-sufficient operation of the controller. Particularly, in environments where a carrier signal (such as an RFID carrier signal) is provided over long periods of time or continuously by one signal source, continuous operation of the active antenna device may be realized.

Further embodiments of the present invention provide an active antenna device, wherein the control is configured to control the antenna, such that the radio signal comprises one or more radiation lobes that, regarding their amplitude and their radiation angle, are different from each other. This may be realized by means of an antenna field with several antenna elements.

An advantage of this embodiment is that radiation lobes of the radio signal can be varied in order to achieve an increased number of tags. Furthermore, energy for the operation of control elements of the antenna field and the controller is decoupled from the signal to be transmitted.

Further embodiments provide an active antenna device that may be connected to a signal source providing the signal to be transmitted by means of a mounting element. The mounting element, for example, is disposed on the active antenna device or the signal source.

One advantage of this embodiment is that commercially available signal sources or signal sources being already in use may be coupled to the active antenna device.

Further embodiments of the present invention provide an active antenna device with a receive antenna that is configured to receive a receive signal and to output the receive signal at the receive terminal, for example the signal source.

One advantage of this embodiment is that, by means of a receive antenna, receive signals may also be received during a transmit operation of the active antenna device, and the receive signal is unaffected by an insertion loss of the coupler.

Further embodiments of the present invention provide an active antenna device that comprises an energy storage device, such as a capacitor or an accumulator, between the energy converter and the antenna. The energy storage device is configured to be charged by means of the power signal and to provide the power signal to the antenna.

One advantage of this embodiment is that the energy storage device may be used as a buffer and, for example, may be charged in time intervals in which the controller has a low energy demand and may provide additional electrical power in time intervals in which the controller has an increased energy demand which might exceed the energy content of the power signal, in order to enable an operation of the controller in time intervals with the increased energy demand.

Further embodiments of the present invention provide radio-frequency identification systems with a radio-frequency identification reader and at least one active antenna device.

One advantage of these embodiments is that a radio-frequency identification reader may be coupled to several antenna devices, for example via a wireless connection, so that a great range may be monitored for the presence of radio-frequency identification tags by means of a radio-frequency identification reader.

Further embodiments of the present invention provide a radio-frequency identification system with active antenna devices and methods for operating an active antenna device.

BRIEF DESCRIPTION OF THE DRAWINGS

Embodiments of the present invention will be detailed subsequently referring to the appended drawings, in which:

FIG. 6 is a table in which coupling factors and insertion losses of an RF coupler, remaining powers of the signal to be transmitted, and powers of a respective power signal which may be provided by RF converters are exemplarily compared;

DETAILED DESCRIPTION OF THE INVENTION

Figure 1:
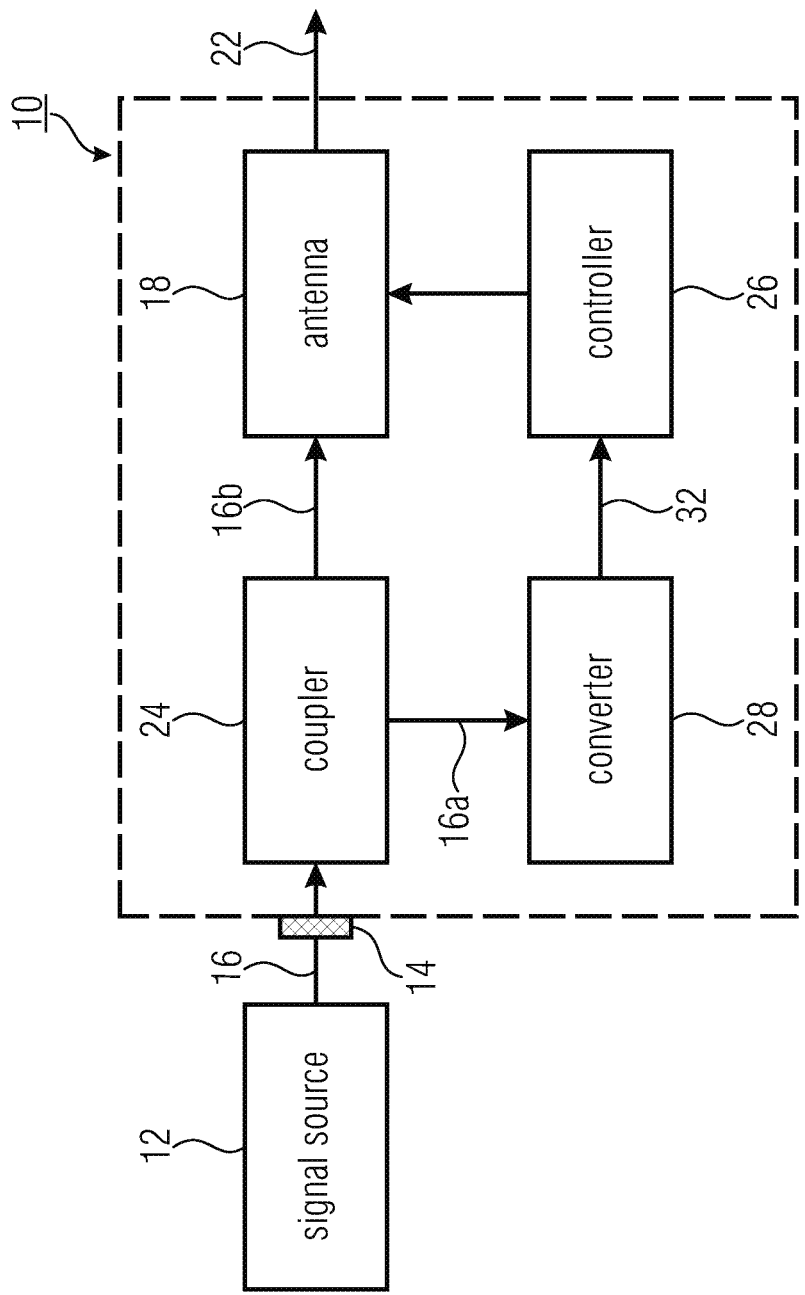
FIG. 1 is a schematic block diagram of an active antenna device according to an embodiment of the present invention that is connected to a signal source.

Before embodiments of the present invention are subsequently detailed referring to the drawings, it should be understood that identical, functionally identical or equal elements, objects and/or structures in different figures are provided with the same reference numerals so that a description of these elements as represented in different embodiments can be exchanged or applied to each other, respectively.

FIG. 1 shows a schematic block diagram of an active antenna device 10 that is connected to a signal source 12. The active antenna device 10 comprises a terminal 14 that is configured to receive a signal to be transmitted 16 that is provided from the signal source 12. The terminal 14 may be a coaxial connection or another wired connection.

The active antenna device 10 further comprises an antenna 18 that is configured to generate a radio signal 22 based on the signal to be transmitted 16. The antenna 18 may comprise an omnidirectional and/or a directional radiation characteristic so that the radio signal 22 may be radiated from the antenna 18 in an omnidirectional and/or directional manner. The radiation characteristic may be temporally constant or variable. For example, the antenna 18 comprises a directional characteristic with at least one preferred direction, a radiation lobe.

The active antenna device 10 includes a coupler 24 that is connected between the terminal 14 and the antenna 18. The coupler 24 is configured to receive the signal to be transmitted 16 and to decouple a signal portion 16a from the signal to be transmitted 16. The coupler 24 is configured to provide the antenna 18 with a residual signal portion 16b of the signal to be transmitted 16. The coupler 24 may be configured to tap off the signal to be transmitted 16 with high impedance and, for example, to decouple 10% or a different percentage of the energy of the signal to be transmitted 16. Alternatively, the coupler 24 may be configured to decouple the signal portion 16a based on a strip waveguide principle and/or waveguide principle.

The active antenna device 10 comprises a controller 26 that is configured to control the antenna 18 and/or properties of the antenna 18, depending on desired or intended properties of the radio signal 22. The properties of the antenna 18 may be a radiation characteristic of the antenna 18 that is controlled based on a desired or intended directional characteristic of the radio signal 22. The properties of the radio signal 22 may be a phase and/or polarization and/or a frequency, a degree of modulation, a modulation type of the radio signal 22. The radiation characteristic of the antenna 18 may comprise one or more radiation lobes, i. e. preferred radiation directions. The polarization may be a linear, for example horizontal or vertical, or circular polarization.

The active antenna device 10 comprises an energy converter 28 that is connected between the coupler 24 and the controller 26 and is configured to provide a power signal 32 for the operation of the controller 26 based on the decoupled signal portion 16a.

If the signal to be transmitted 16 comprises a frequency, the decoupled signal portion 16a may also comprise this frequency. The energy converter 28 may be configured to change a frequency and/or a signal shape of the decoupled signal portion 16a and/or to provide the power signal 32 with a frequency that is different from the frequency of the decoupled signal portion 16a and/or with a changed signal shape. The power signal 32 may be a direct current (DC) signal or an alternating current (AC) signal, for example with 50 Hz or 60 Hz. Alternatively or additionally, the energy converter 28 may be configured to convert the signal portion 16a such that the power signal 32 comprises a square shape (rectification). Alternatively, the power signal may comprise a different signal shape, such as a sawtooth pattern. In other words, the energy converter 28 may be an AC-AC converter or an AC-DC converter.

The active antenna device 10 may be connected to existing signal sources, for example RFID readers. An operation of the active component (controller 26) may be realized based on the power signal and therefore based on the signal to be transmitted 16, independent of an external energy supply such as a power connection or a battery.

Figure 2:
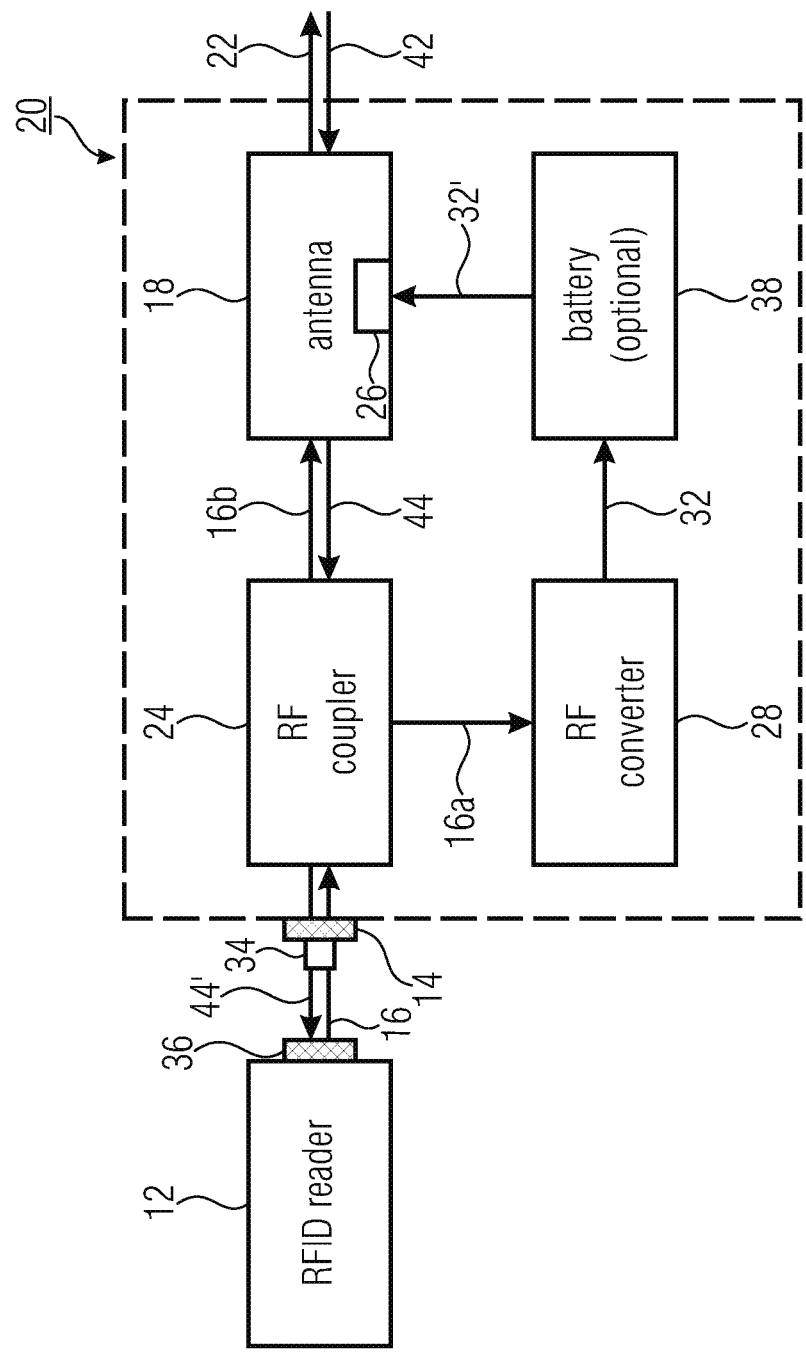
FIG. 2 is a schematic block diagram of an active antenna device according to a further embodiment of the present invention that is connected to a terminal of an RFID reader by means of a mounting element and comprises an energy storage device.

FIG. 2 shows a schematic block diagram of an active antenna device 20 according to a further embodiment of the present invention that is configured to transmit RFID signals, and that can be employed in the RFID-field.

Figure 8:
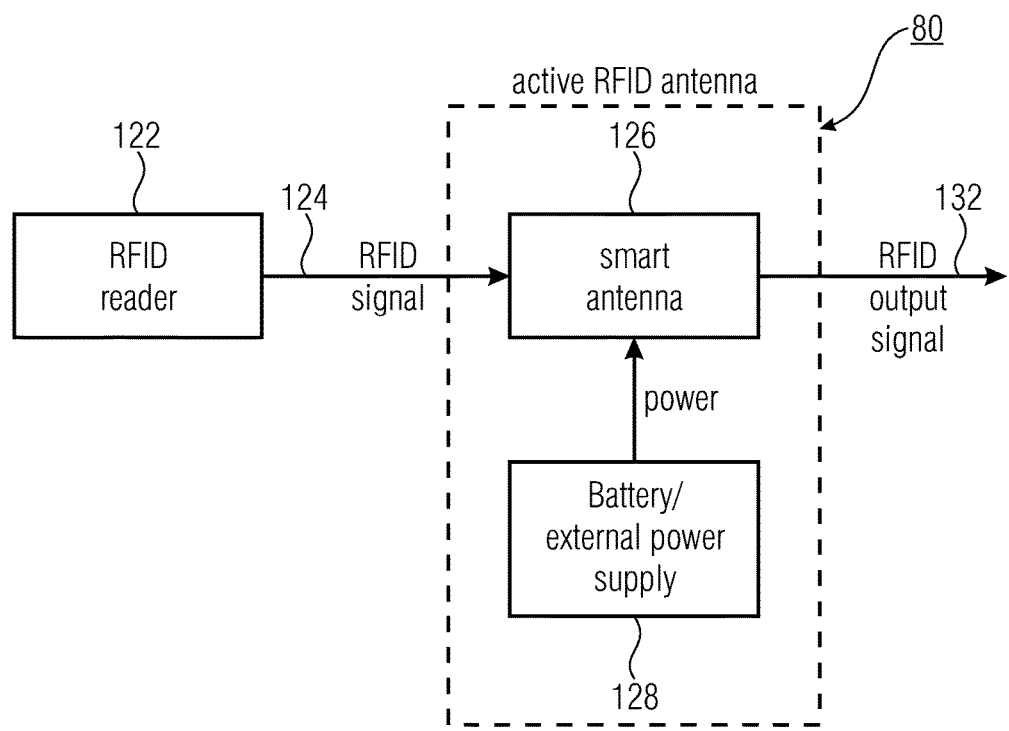
FIG. 8 is a schematic block diagram of a radio-frequency identification reader with an active radio-frequency identification antenna according to conventional technology.

At a terminal 14, the active antenna device 20 is connected to a terminal 36 of the RFID reader 12 (signal source) of an RFID system by means of a mounting element 34. The RFID reader 12 may be configured identically or similarly to the RFID reader 122 in FIG. 8. The signal to be transmitted 16 is an RFID signal. The mounting element 34 may be connected to the terminal 14. Alternatively, the mounting element 34 may be connected to the RFID reader 12 and/or its terminal 36. Alternatively or additionally, the mounting element 34 or a connection element may be disposed between the terminal 14 of the active antenna device 20 and the terminal 36 of the RFID reader 12.

RFID signals may comprise frequencies of several kilohertz up to several megahertz or even gigahertz. The coupler 24, based on the high frequencies of the transmit signal 16, is a radio-frequency (RF) coupler. The radio-frequency coupler 24 may be the model BDCN-20-13+ of the company Mini-Circuits®. The converter 28, based on the high frequencies of the decoupled signal portion 16a, is a radio-frequency converter. The radio-frequency converter 28 may be the model PCC110 of the company Power Cast®. The power signal 32 may be a direct current signal.

The active antenna device 20 comprises an optional (buffer) battery 38 between the radio-frequency converter 28 and the antenna 18 that is configured to receive the power signal 32 so that the battery 38 can be charged by means of the power signal 32.

The antenna 18 comprises the controller 26. This may also be referred to as smart antenna.

A power consumption of active components, such as electronics or a calculating unit of the controller 26, may be temporally variable. Thus, the controller 26, for example, may comprise a microcontroller. Microcontrollers may comprise a sleep mode and an active mode and may switch between these operation modes. In sleep mode, a power demand is lower than in active mode. An average power demand is a power which the controller 26 necessitates on average within a time interval. For example, the time interval may be 1 minute, one hour or one day. Energy of the DC signal 32 may be stored by a means of a battery 38 so that the power supply of the controller 26 is stabilized.

Thus, electric energy can be stored when the power consumption of the controller 26 is lower than the average power demand (i. e., below an average value of the power demand) or lower than an electric power of the power signal 32 so that the stored energy may be used when the power consumption of the controller 26 or further active components is higher than the average power demand (i. e., exceeds the average value of the power demand).

A measure of the portion which is decoupled from the signal to be transmitted 16 in the shape of the decoupled signal portion 16a may therefore be based on an average power demand of the controller 26, an efficiency of the battery 38, an efficiency of the RF converter 28, and, possibly, an efficiency of the RF coupler 24.

The battery 38 is configured to provide the antenna 18 with a power signal 32' that is based on the power signal 32. This means that the battery 38, for example, is being charged in time intervals where the controller 26 of the antenna 18 comprises a power demand that is lower than a power of the power signal 32. In time intervals where a power demand of the controller 28 is higher than a power of the power signal 32, the battery 38 is being discharged. In other words, the power signal 32' may have a lower or higher power than the power signal 32, and the battery 38 may be a power buffer.

A power of the decoupled signal portion 16a, i. e., a measure by which the portion 16b is reduced (attenuated) compared to the signal to be transmitted 16, may be compensated for by an increase of a signal power of the signal to be transmitted 16 by the signal source, for example the RFID reader 12. Alternatively or additionally, an antenna element or an antenna structure of the antenna 18 may comprise an antenna gain that is increased compared to passive or traditional antennas. That means that a power of the signal to be transmitted 16 that is reduced by means of decoupling the signal portion 16a may be compensated for by an increased signal power in the signal source 12 and/or an increased antenna gain in the antenna 18.

Based on standards, an output power of RFID readers may be regionally limited. For example, an output power of the RFID readers is currently limited to 2 $W_{ERP}$ (ERP=effective radiated power) in Europe, which is equivalent to 35.15 dBi. For example, antenna gains may comprise values of approximately 7 dBi which may lead to a typical output power of RFID readers in a range of approximately 28 dBm, corresponding to a value of approximately 630 mW.

In other words, a small part of the transmit power in the signal to be transmitted 16 is branched off by the signal branch in the RF coupler 24 in order to provide the active circuits of the antenna 18 with power. The portion of said signal 16a can be kept so small that the performance of the RFID system remains unaffected or nearly unaffected. This can be ensured, if the reader 12 has a power reserve. For most commercially available readers this reserve is approximately 2 dB. The same may be used to increase a power of the signal to be transmitted 16 and to maintain a limit of the output power (approximately 2 $W_{ERP}$). Even if the reader does not have a reserve, an increase of the antenna gain can be used in order to provide the needed power.

A coupler device (coupler) 24 uses a part of the signal to be transmitted 16 at an output of the RFID reader 12 for the power supply of the antenna 18 and/or its controller 26. Potential or typical coupling factors, for example, are 10 dB, 20 dB or 30 dB meaning that 10% (signal portion 16a:16b corresponds to 1:9), 1% (signal portion 16a:16b corresponds to 1:99) or 0.1% (signal portion 16a:16b corresponds to 1:999) of the signal power are being decoupled. The residual signal passes through the coupling element 24 with low losses and reaches the antenna 18 where it is transformed into a radio signal and transmitted. After decoupling, the signal portion 16a that is used for the power supply may be converted from radio frequency (RF) down to direct current (DC) by means of the RF converter 28. For this purpose, an RF DC converter 28 may be used.

An efficiency of these converters may depend on an input power, i. e. a power of the decoupled signal portion 16a, and, for example, may be in a range between 30% and 60%, 35% and 55% or 37% and 45%.

The antenna 18 is configured to receive a receive signal 42 and to provide the receive signal 42 in wired shape 44. The active antenna device 20 is configured to provide the receive signal in wired shape 44 via the RF coupler 24 at the output 14 as a receive signal 44' that is attenuated by the RF coupler 24. Antenna devices that are configured to use an antenna for transmitting and receiving a radio signal 22 and 42, respectively, may be referred to as monostatic. In this case, an inserted insertion loss, for example by the RF coupler 24, may attenuate both the signal to be transmitted 16 and the receive signal 42.

The terminal 36 may be referred to as transmitter terminal and receiver terminal. Alternatively, the RFID reader 12 may also comprise a further (receiver) terminal that is configured to receive the receive signal 42'.

On the forward link, i. e., starting from the signal source 12 in the direction of the antenna 18, the influence of the RF coupler 24 may be nearly negligible, as the influence can be compensated for by increasing the output power of the reader, i. e. the signal source 12, or with a higher antenna gain of the antenna 18. A reduced performance of the RFID system in monostatic scenarios, i. e., one antenna for receiving and transmitting the signal, may be reduced by insertion losses due to insertion attenuations in the receiver direction, i. e., from the antenna 18 via the RF coupler 24 in the direction of the signal source 12. The reduction may be compensated for by an additional antenna gain. An additional antenna gain may increase a signal-to-noise ratio at the receiver input of the signal source. Consequently, one object of a system configuration of an active antenna device, such as the active antenna 10 or 20, may be to limit a power portion that is used for operating the antenna circuits, i. e. a measure of the decoupled signal portion, to a minimum.

Alternative embodiments show active antenna devices where, instead of the optional battery 38 a different energy storage device is disposed. This may be a capacitor or a coil element.

Figure 3:
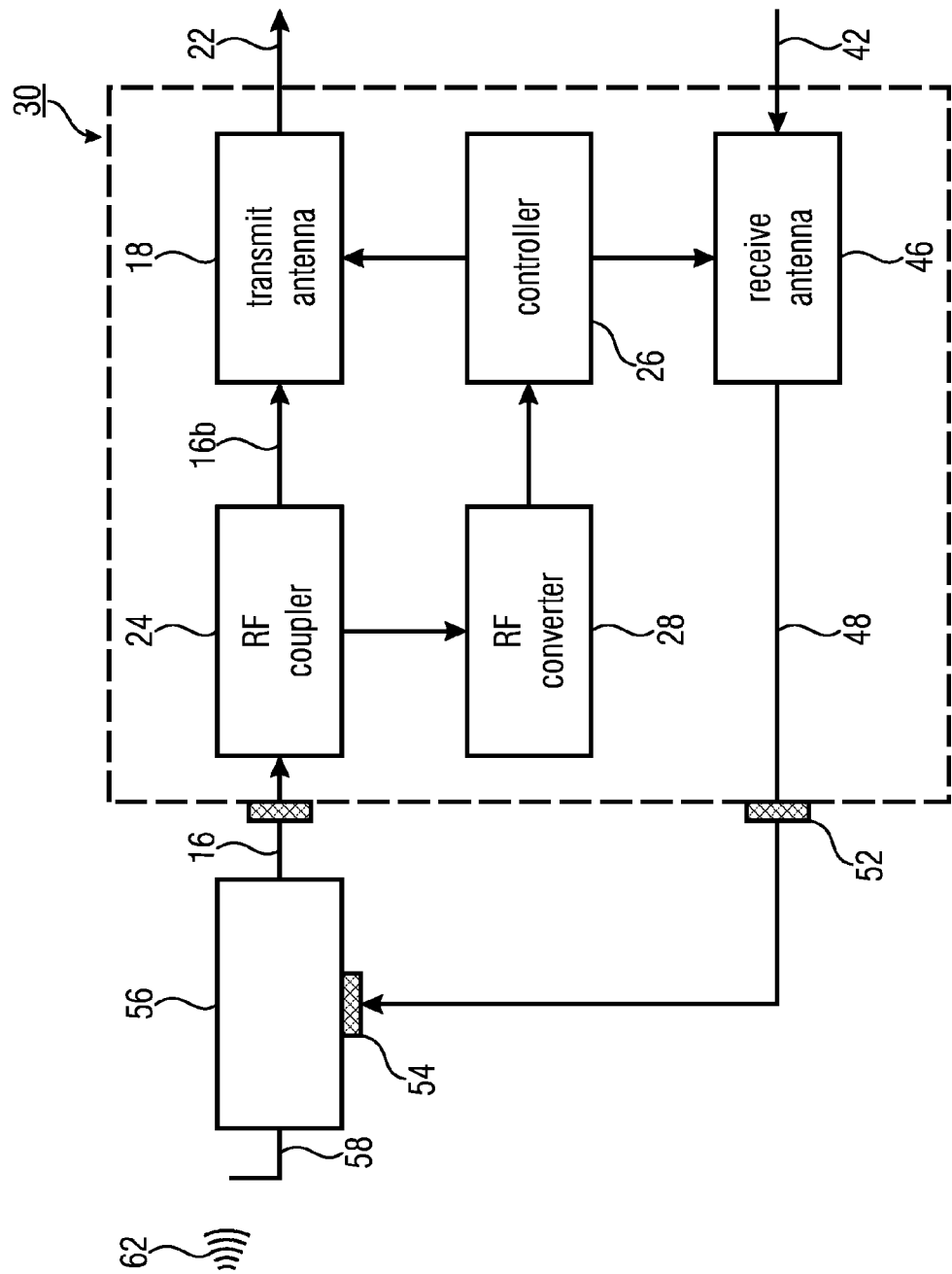
FIG. 3 is a schematic block diagram of an active antenna device according to a further embodiment of the present invention that comprises a transmit antenna and a receive antenna.

FIG. 3 shows a schematic block diagram of an active antenna device 30 according to a further embodiment of the present invention. The active antenna device 30 comprises a (transmit) antenna 18 and a receive antenna 46. The antenna 18 is configured to transmit a signal to be transmitted 16 and a portion 16b of the signal to be transmitted 16, respectively, in the shape of a radio signal 22.

The receive antenna 46 is configured to receive the radio signal 42 and to transform it into a wired signal 48. The active antenna device 30 is configured to output the wired signal 48 at a further terminal 52. The further terminal 52 is coupled to a receive terminal 54 of a signal source 56. The signal source 56 is configured to provide the signal to be transmitted 16 and to receive the wired signal 48 at the receive terminal 54.

The controller 26 is configured to control the transmit antenna 18 and the receive antenna 46 and may be part of the antenna 18 in alternative embodiments.

One advantage of this embodiment is that insertion losses of an RF coupler 24 in a receiving direction via the receive antenna 46 towards the signal source, i. e. the RFID reader 56, may be negligible.

In bistatic scenarios, where different antennas are used for transmitting and receiving, the object to limit a power portion that is used for operating the antenna circuits to a minimum is negligible.

The signal source 56 comprises a receiving means 58 that is configured to receive a wireless signal 62 and to provide the signal to be transmitted, for example by means of a radio-frequency signal generator. The signal source 56 may be coupled to an RFID reader and configured to receive from the same, by means of the wireless signal 62, information that at least partially affects the signal to be transmitted 16. Information of the wireless signal 62 may at least partially affect which frequency, which transmitting direction (preferred direction) or which information the radio signal 22 comprises.

Alternatively, a further device may also be coupled to the active antenna device 30 and the further terminal 52, respectively. Thus, the wired signal 48 can be provided to the further device.

Figure 4:
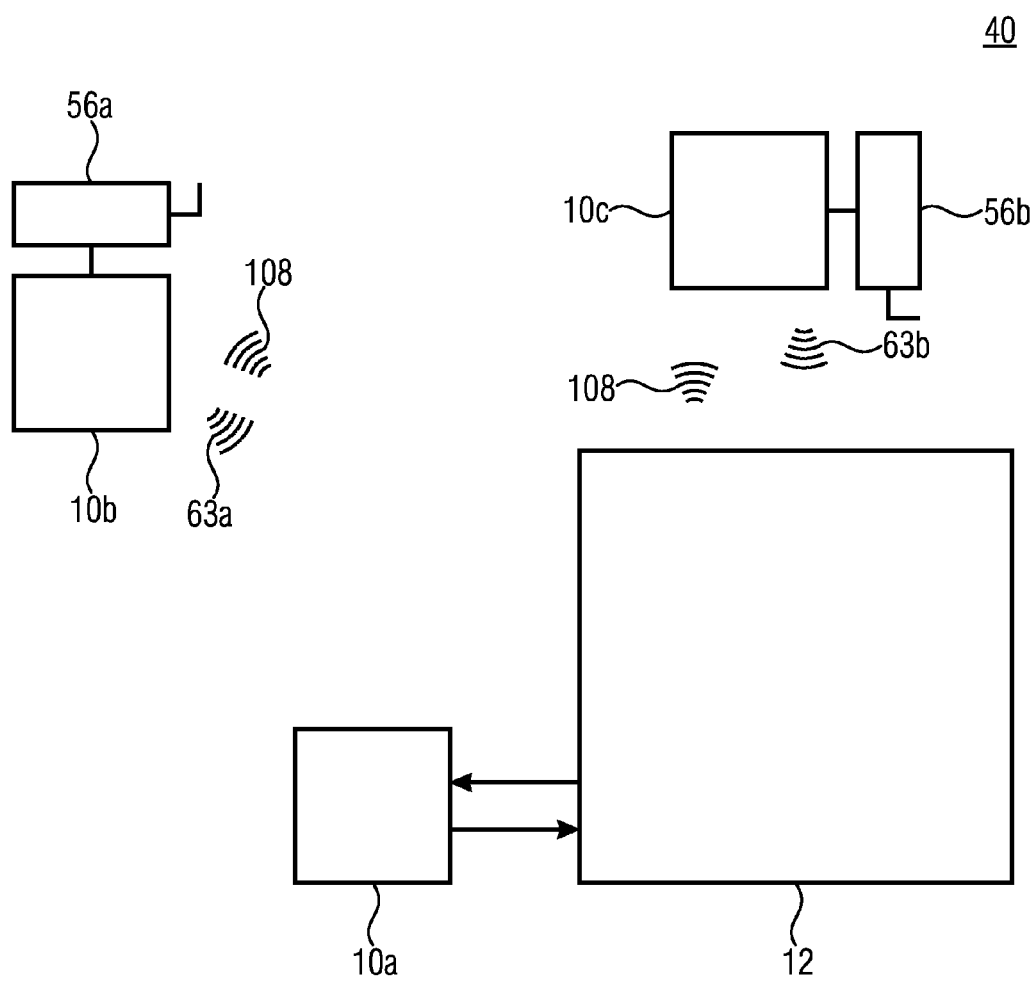
FIG. 4 is a schematic block diagram of a radio-frequency identification system with a radio-frequency identification reader and three active antenna devices according to an embodiment of the present invention.

FIG. 4 shows a schematic block diagram of a radio-frequency identification system 40 with a radio-frequency identification reader 12 and three active antenna devices 10a, 10b, and 10c. The antenna device 10a is wired to the radio-frequency identification reader 12. In other words, the radio-frequency identification reader may serve as system master.

The signal sources 56a and 56b are coupled to the active antenna devices 10b and 10c and configured to receive the wireless signal 62 from the radio-frequency identification reader 12 and to provide the active antenna devices 10b and 10c with signals to be transmitted. The signal sources 56a and 56b are configured to transmit information to the radio-frequency identification reader 12 by means of a wireless signal 63a and 63b, respectively. For example, information of the wireless signal 63a of the active antenna device 10b and the wireless signal 63b of the active antenna device 10c, respectively, may be information about identified radio-frequency identification tags.

A connection of active antenna devices and of readers with active antenna devices 10b and 10c, respectively, enables a distributed monitoring of a greater range by different, if need be, broadly distributed wirelessly connected readers having active antenna devices.

Alternative embodiments comprise a radio-frequency identification reader 12 that is coupled to at least one active antenna device 10, 20 or 30.

Figure 5:
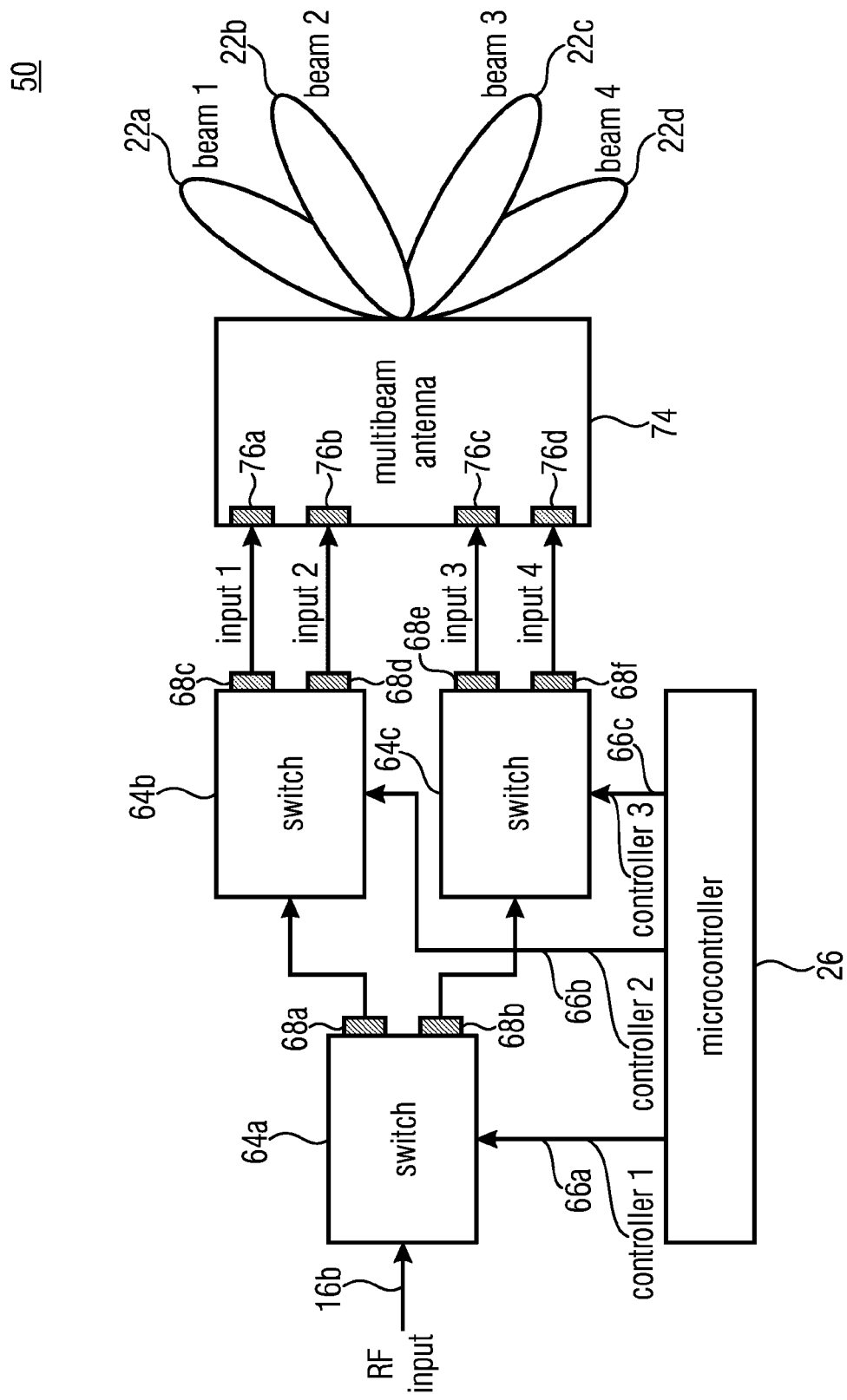
FIG. 5 is a schematic block diagram of a smart antenna.

FIG. 5 shows a schematic block diagram of a smart antenna 50, for example the antenna 18 in FIG. 2.

The radio-frequency input signal 16b is applied to a switch 64a. The switch 64a is configured to apply the radio-frequency input signal 16b completely or partially to at least one of several, for example two, outputs 68a and 68b, based on a control signal 66a (controller 1). This means that the radio-frequency input signal 16b can be applied completely or partially to the output 68a and/or completely or partially to the output 68b, based on the control signal 66a.

At the output 68a, a switch 64b is coupled to the switch 64a on the input side. At the output 68b, a switch 64c is coupled to the switch 64a on the input side.

Switches 64b and 64c comprise outputs 68c and 68d and 68e and 68f, respectively, and may comprise a same configuration as the switch 64a. Switch 64b is configured to be controlled by means of a control signal 66b (controller 2) and to completely or partially provide an input signal that is applied to the switch 28b at at least one of its outputs on the output side. The switch 64c is configured to be controlled by means of a control signal 66c (controller 3). The controller 26 is implemented as a microcontroller and configured to provide the control signals 66a-c.

In other words, the radio-frequency input signal 16b is directed or distributed to four outputs 68c-f by means of the control signals 66a-c. An antenna 74 is configured to radiate the radio signal 22a-d in several preferred directions that are different from each other. A preferred direction may be referred to as beam or radiation lobe. The antenna 74, for example, is configured to transmit a respective radio signal 22a-d in at least one of four differing radiation lobes that are different from each other (beam 1-4). In which beam or beams 1-4 the radio signal 22a-d is being transmitted, based on the RF input signal 16b from the antenna 74, may at least partially be affected by the fact at which input 76a-d of the antenna 74 the RF input signal 16b is applied to the antenna 74. For example, one input 76a-d each may be connected to a plurality of antenna elements of the antenna 74, so that a radiation of the radio signal 22a-d leads to the formation of a preferred direction at the antenna elements, for example by means of superposition.

The antenna 74 and/or the switches 64a-c may comprise phase shifters that are configured to modify a phase of a signal respectively applied to an input, for example, in order to realize a preferred direction or radiation characteristic by means of superposition of different phases (phase positions) of the signal to be transmitted at different antenna elements. Alternatively or additionally, the antenna 74 may comprise the phase shifters coupled to the same, such that a preferred direction is selectable by means of applying the signal to be transmitted 16b to one of the inputs 76a-d.

The antenna 74 is configured to comprise different preferred directions by means of the beams 1-4 and may be referred to as a multibeam antenna. The multibeam antenna 74, for example, comprises an antenna array, i. e. an antenna field with 2×2, i. e. 4, antenna elements. A so-called Butler matrix network with N antenna elements may be used to generate a number of N different beams, depending on to which one of N inputs of the multibeam antenna 74 the input signal is applied, i. e. which input is being accessed. If the smart antenna 50 and the multibeam antenna 74, respectively, comprises four input channels (input gates) 76a-d and four antenna elements, one of four orthogonal available beams (beams 1-4) may be selectable or controllable, based on the fact which gate 76a-d and which channel, respectively, is being accessed. During operation of the antenna 74, the radiation direction may be dynamically variable by means of a dynamic control by the microcontroller 26.

A beam selection may be automated by means of the switches 64a-c and by means of the microcontroller 26. The microcontroller 26 and the switches 64a-c form a so-called switch circuit. Instead of an external power supply, for example by means of an USB cable, the smart antenna 50 may be supplied in an energy self-sufficient manner by means of a power that is decoupled from the signal to be transmitted. A predominant disadvantage of the conventional technology, that power is supplied by means of cable or battery, may be overcome by means of an energy self-sufficient supply. In that way, a circle of potential users which up to now used passive antennas as a standard may be expanded.

Furthermore, by compensating caused power reductions (for example, by insertion loss or decoupling of signal portions) technological barriers indicated by an attenuated radio signal may be overcome, for example a reduced range of the radio signal or a reduced identification rate of the RFID reader.

The smart antenna 50 may be configured to receive input signals by means of the multibeam antenna 74. Alternatively or additionally, the smart antenna 50 may comprise a further receive antenna. In this case, the multibeam antenna 74 may be configured to transmit a signal to be transmitted 16b in the shape of a radio signal. The further antenna may be configured to receive radio signals and to provide the signal source providing the signal to be transmitted or a different device with the same. The controller 26 may be configured to control the antenna 74 such that the radio signal 22a-d comprises one or more radiation lobes. The controller 26 may be configured to adjust or select a radiation angle of a radiation lobe. The radiation lobes may be arranged orthogonally to each other in space. In other words, by a radiation lobe, the direction of the radio transmit signal 22a-d may be adjusted or limited.

In other words, using an external power supply or batteries that have to be replaced may be avoided. A signal portion may be decoupled from a high-power RF signal that is provided by the RFID reader and to be transmitted. With this signal portion, electronics of the antenna may be supplied with sufficient power. In this way, the antenna may be configured self-sufficiently, i. e. in an (energy) autonomous way, as the same does not necessitate an additional power supply or an additional battery change and does not lose attractiveness for potential users and customers.

FIG. 6 shows a table that exemplarily compares coupling factors and losses of an RF coupler, remaining powers of a signal to be transmitted ($P_{OUTPUT}$) and powers of a respective power signal ($P_{harvested}$) harvested) that may be provided by RF converters. For the signal to be transmitted, a power of 28 dBm, i. e. approximately 630 mW, is assumed. For the coupler, an insertion loss of 0.3 dB is assumed that, for example, may partially be caused by ohmic loss at electric contacts. For the converter, an energy efficiency of 50% is assumed. $P_{OUTPUT}$ denotes the output power of the signal to be transmitted after a portion has been decoupled for power supply. $P_{harvested}$ denotes a power that can be provided (harvested) from the decoupled signal portion by means of the converter. The losses denote the extent by which the power of the signal to be transmitted is reduced and, in the present table, the same consist of the constant portion of insertion loss (0.3 dB) and the variable portion of coupling loss.

The values are only exemplary values in order to make clear that there is a compromise between the coupling factor and the losses for the RFID signal. The higher the coupling factor and a resulting coupling loss (and the power usable for power supply), respectively, the higher the losses. For the represented range, it is apparent that powers between 0.3 mW and 31 mW (rows 3 and 1, respectively) can be achieved, i. e. be harvested, with losses between 0.3 dB (row 3) and 0.75 dB (=0.3 dB insertion loss+0.45 dB coupling loss; row 1), respectively. A coupling value of 30 dB means that a portion of 0.1% of the power of the signal to be transmitted is being decoupled and the same leads to a corresponding coupling loss of 0.0044 dB. With greater portions, for example 1% at a coupling value of 20 dB, the coupling loss also increases to 0.044 dB.

In other words, FIG. 6 shows a power estimation for a reader output power of 28 dBm, coupling element insertion losses of 0.3 dB and a RF-DC converting efficiency of 50%.

Figure 7:
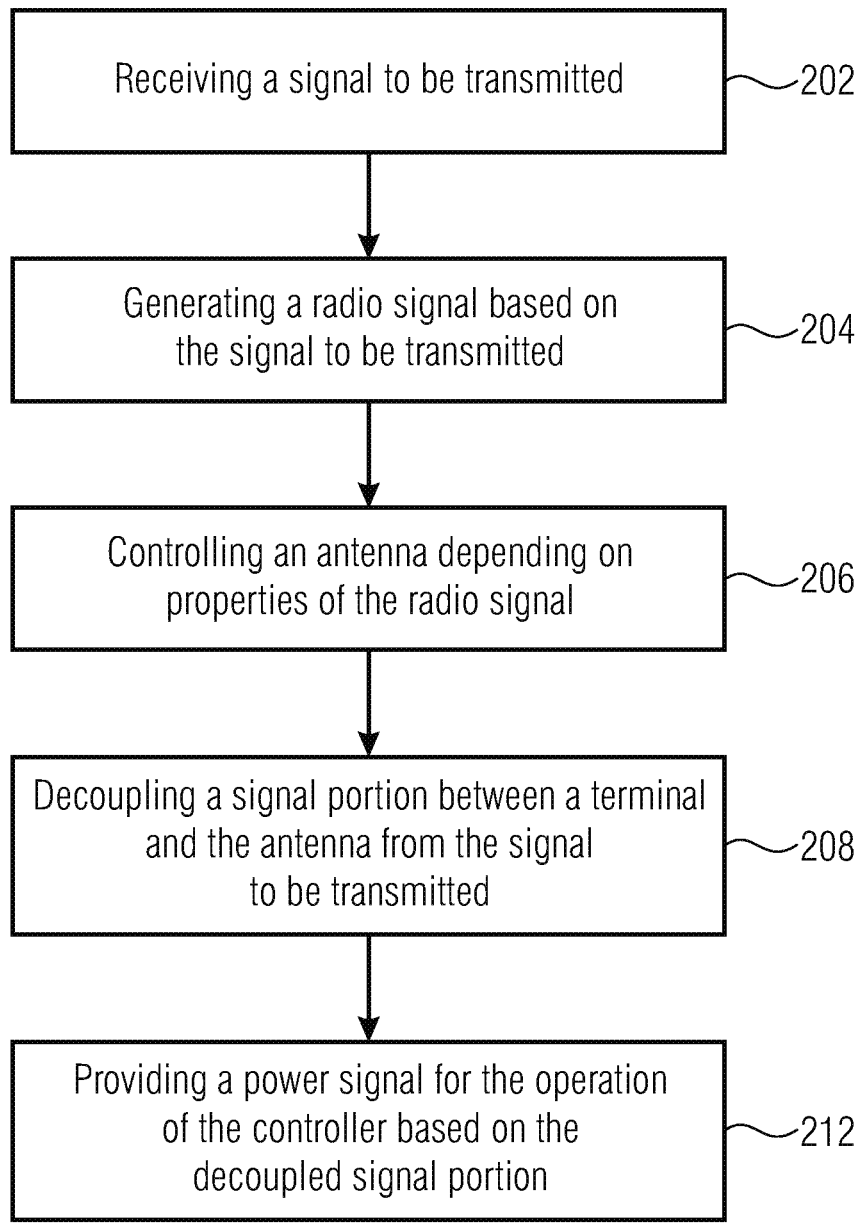
FIG. 7 is a schematic flowchart of a method for operating an active antenna device according to an embodiment of the present invention.

FIG. 7 shows a schematic flowchart of a method 200 for operating an active antenna device. A first step 202 comprises receiving a signal to be transmitted. A second step 204 comprises generating a radio signal based on the signal to be transmitted, for example by applying the residual signal portion 16b to an antenna structure. A third step 206 comprises controlling an antenna independent of (intended or desired) properties of the radio signal. A fourth step 208 comprises decoupling a signal portion between a terminal and an antenna from the signal to be transmitted. A fifth step 212 comprises providing a power signal for operating a controller based on the decoupled signal portion.

The method 200 enables a supply of active RFID antennas with power, without having to use an external power supply. Furthermore, using batteries that have to be changed can be avoided. For example, capacitors or accumulators may be used as buffers without any need for maintenance, i. e. not requiring change or replacement, or long maintenance intervals between changes. The method enables supplying the active antenna by using the already existing RFID signal. The method is almost transparent for RFID readers, only an output power of the reader may need to be adapted in order to compensate for inserted insertion losses of the active antenna device. An extension of the concept to other technology, for example mobile radio communication or wireless networks, is also possible. In principle, the concept may be applicable to all technological areas where an active antenna device may be employed for transmitting radio signals. For RFID systems, the method 200 is of interest, as in these systems the RFID carrier may be activated at all times in order to supply power to RFID tags to be identified. This means that the signal to be transmitted may be applied to an active antenna. In addition, the method 200 is very well-suited for a combination with existing standard readers, making investments in existing infrastructure redundant.

In other words, embodiments show systems and methods for supplying self-sufficient/autonomous RFID antennas with power, without an additional external power supply.

Even though some aspects have been described within the context of a device, it is understood that said aspects also represent a description of the corresponding method so that a block or a structural component of a device is also to be understood as a corresponding method step or as a feature of a method step. By analogy therewith, aspects that have been described within the context of or as a method step also represent a description of a corresponding block or detail or feature of a corresponding device.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An active antenna device for sending RFID signals, comprising:
   a terminal for receiving an RFID signal to be transmitted;
   an antenna for generating a radio signal based on the RFID signal to be transmitted;
   a controller that is configured to control properties of the antenna;
   a coupler between the terminal and the antenna that is configured to decouple a signal portion from the RFID signal to be transmitted;
   an energy converter that is connected between the coupler and the controller and configured to provide a power signal for the operation of the controller based on the decoupled signal portion; and
   an energy storage device between the energy converter and the controller that is configured to at least partially receive the electric energy from the energy converter and to provide the controller with the same;
   wherein the active antenna device is an energy self-sufficient device.

2. The active antenna device according to claim 1, wherein the controller is configured to control the antenna such that the radio signal comprises one or more radiation lobes and/or is configured to adjust a radiation angle of one or more radiation lobes of the radio signal.

3. The active antenna device according to claim 1, wherein the antenna comprises a plurality of antenna elements and at least one switch that is connected to an antenna element, and wherein the controller is configured to control the at least one switch such that, based on the properties of the radio signal or the antenna, the RFID signal to be transmitted can be applied to at least one of the antenna elements.

4. The active antenna device according to claim 1, wherein the terminal is connectable to an antenna terminal of a signal source providing the RFID signal to be transmitted.

5. The active antenna device according to claim 4, with a mounting element that is connected to the terminal and that is connectable to the antenna terminal of the signal source providing the RFID signal to be transmitted.

6. The active antenna device according to claim 1, with a connection element that is connectable to the signal source providing the RFID signal to be transmitted.

7. The active antenna device according to claim 1, wherein the antenna is a transmit-receive antenna that is configured to radiate the radio signal, and to receive a receive signal and to provide the same at the terminal.

8. The active antenna device according to claim 1, with a receive antenna in order to receive a receive signal and to provide the same at a receive terminal.

9. The active antenna device according to claim 8, wherein the controller is configured to control the receive antenna.

10. The active antenna device according to claim 1 that is coupled to a signal source comprising a radio-frequency signal generator and being configured to provide the RFID signal to be transmitted based on a signal received by means of a wireless communication interface.

11. The active antenna device according to claim 1, wherein the energy storage device is an accumulator or an electrical capacitor.

12. The active antenna device according to claim 1, wherein the energy converter is a radio-frequency direct current converter.

13. The active antenna device according to claim 1, wherein the coupler is configured to decouple at least 0.1% of the power of the RFID signal to be transmitted.

14. A radio-frequency identification system, comprising:
   a radio-frequency identification reader; and
   at least one active antenna device according to claim 1.

15. A method for an energy self-sufficient operation of an active antenna device for sending RFID signals, comprising:
   receiving an RFID signal to be transmitted;
   generating a radio signal based on the RFID signal to be transmitted;
   controlling antenna properties;
   decoupling a signal portion between a terminal and an antenna from the RFID signal to be transmitted; and
   providing a power signal for the energy self-sufficient operation of a controller based on the decoupled signal portion using an energy storage device between the energy converter and the controller that is configured to at least partially receive the electric energy from the energy converter and to provide the controller with the same.

16. The method according to claim 15, wherein the energy storage device is an accumulator or an electrical capacitor.

* * * * *